US012559039B2

(12) United States Patent
Sirrenberg et al.

(10) Patent No.: US 12,559,039 B2
(45) Date of Patent: Feb. 24, 2026

(54) ROOF RAIL FOR A MOTOR VEHICLE, MOTOR VEHICLE AND METHOD FOR MOUNTING A ROOF RAIL ON A ROOF OF A MOTOR VEHICLE

(71) Applicant: FYSAM Auto Decorative GmbH, Steinheim am Albuch (DE)

(72) Inventors: Stefan Sirrenberg, Neckargerach (DE); Rolf Vetter, Birenbach (DE)

(73) Assignee: FYSAM AUTO DECORATIVE GMBH, Steinheim Am Albuch (DE)

( * ) Notice: Subject to any disclaimer, the term of this patent is extended or adjusted under 35 U.S.C. 154(b) by 181 days.

(21) Appl. No.: 18/265,489

(22) PCT Filed: Dec. 9, 2021

(86) PCT No.: PCT/EP2021/085077
§ 371 (c)(1),
(2) Date: Jun. 6, 2023

(87) PCT Pub. No.: WO2022/122972
PCT Pub. Date: Jun. 16, 2022

(65) Prior Publication Data
US 2024/0025348 A1     Jan. 25, 2024

(30) Foreign Application Priority Data
Dec. 11, 2020    (DE) ......................... 102020133147.9

(51) Int. Cl.
*B60R 9/04*          (2006.01)
(52) U.S. Cl.
CPC ..................................... *B60R 9/04* (2013.01)
(58) Field of Classification Search
CPC ................................. B60R 9/04; B60R 9/058
(Continued)

(56) References Cited

U.S. PATENT DOCUMENTS 5,497,925 A * 3/1996 Lumpe ...................... B60R 9/04
                                                     224/326
5,699,944 A * 12/1997 Duran ...................... B60R 9/04
                                                     411/908
(Continued)

FOREIGN PATENT DOCUMENTS

CN          105102271 A      11/2015
CN          107415841 A      12/2017
(Continued)

OTHER PUBLICATIONS

International Search Report issued in corresponding International Application No. PCT/EP2021/085077, dated Mar. 11, 2022, pp. 1-2, English Translation.
(Continued)

*Primary Examiner* — Scott T McNurlen
(74) *Attorney, Agent, or Firm* — Carter, DeLuca & Farrell LLP; George Likourezos

(57)          ABSTRACT

The invention relates to a roof rail for a motor vehicle, having at least one gallery bar and at least one fastening device for fastening the gallery bar at the end to a roof of the motor vehicle, the fastening device comprising a fastening element, which is in the form of an extruded part, and a cover which receives the fastening element at least in regions. It is provided that the fastening element rests against the cover on its side facing away from the gallery bar. The invention further relates to a motor vehicle with a roof and a roof rail mounted to the roof, as well as a method for mounting a roof rail on a roof of a motor vehicle.

7 Claims, 3 Drawing Sheets

Figure 1:
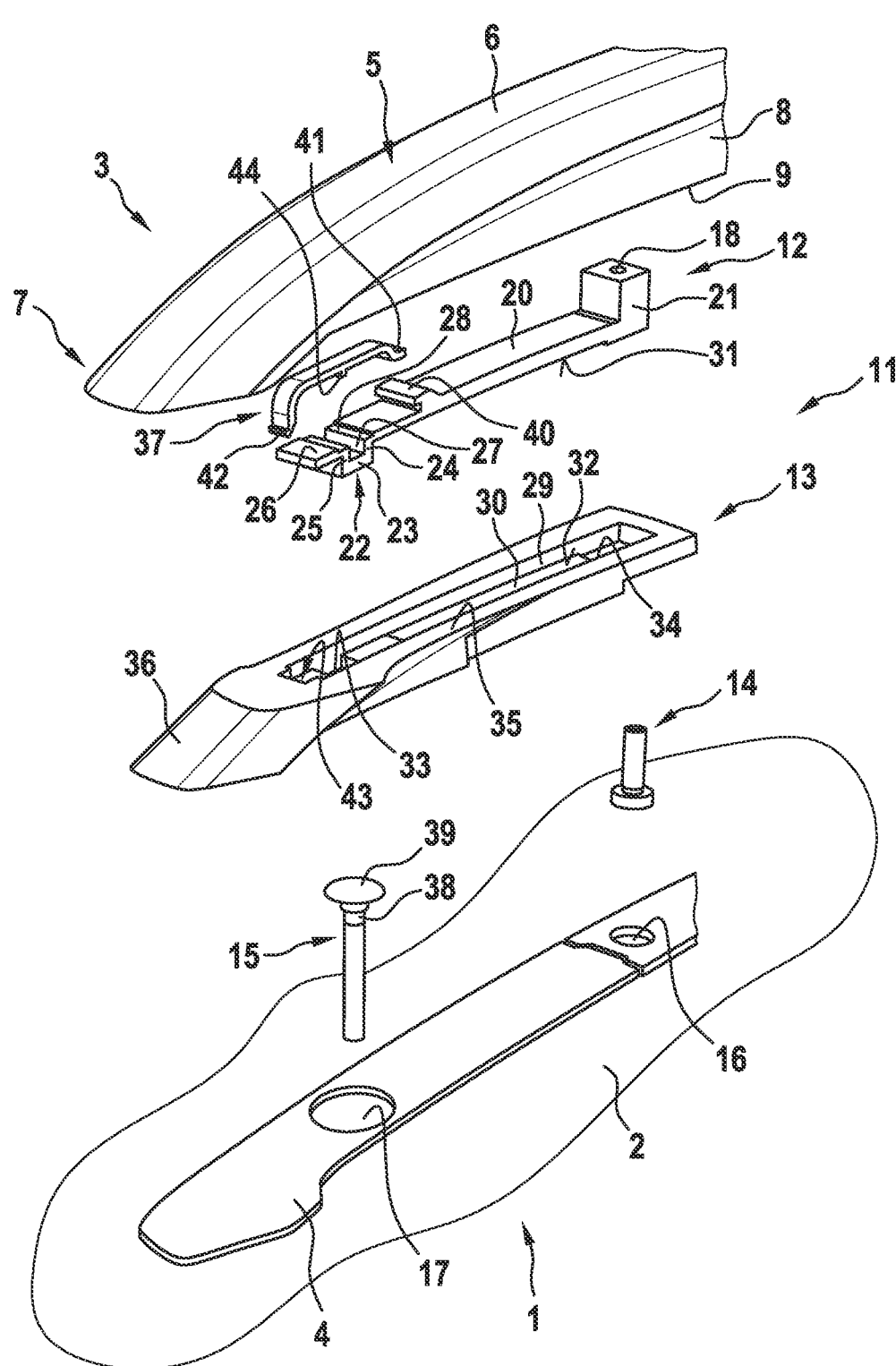

(58) Field of Classification Search
USPC ................................................ 224/309, 326
See application file for complete search history.

(56) References Cited

U.S. PATENT DOCUMENTS

|  |  |  |  |  |
|---|---|---|---|---|
| 9,327,653 | B2 * | 5/2016 | Sirrenberg | ................ B60R 9/04 |
| 10,005,403 | B2 * | 6/2018 | Calvin | .................... B60J 7/106 |
| 11,046,254 | B2 * | 6/2021 | Chenaud | ................. B60R 9/058 |
| 11,260,801 | B2 * | 3/2022 | Chervu | .................. B60R 13/04 |
| 11,390,210 | B2 * | 7/2022 | Chen | ........................ B60Q 1/44 |
| 2005/0236342 | A1 | 10/2005 | Jeong | |
| 2007/0138221 | A1 * | 6/2007 | Binder | ...................... B60R 9/04 |
|  |  |  |  | 224/322 |
| 2014/0353350 | A1 | 12/2014 | Sirrenber | |
| 2016/0009227 | A1 | 1/2016 | Binder et al. | |
| 2020/0231095 | A1 | 7/2020 | Chervu | |
| 2020/0377027 | A1 | 12/2020 | Kim et al. | |

FOREIGN PATENT DOCUMENTS

|  |  |  |  |  |
|---|---|---|---|---|
| DE | 10350288 | A1 | 6/2005 | |
| DE | 202011005653 | U1 | 8/2011 | |
| DE | 102012014697 | A1 | 1/2014 | |
| EP | 0806321 | A2 | 11/1997 | |
| GB | 2386591 | A * | 9/2003 | .............. B60R 9/04 |
| JP | 2004106684 | A | 4/2004 | |
| JP | 2005297943 | A | 10/2005 | |
| JP | 200738987 | A | 2/2007 | |
| JP | 2009298230 | A | 12/2009 | |
| WO | 2013/107683 | A1 | 7/2013 | |
| WO | 2015/085431 | A1 | 6/2015 | |

OTHER PUBLICATIONS

Chinese Office Action issued by the China Intellectual Property Office in connection with International Application No. 202180075897.2, dated Apr. 29, 2025.

Japanese Office Action issued by the Japanese Patent Office in connection with International Application No. 2023-535399, dated Jun. 24, 2025.

* cited by examiner

ROOF RAIL FOR A MOTOR VEHICLE, MOTOR VEHICLE AND METHOD FOR MOUNTING A ROOF RAIL ON A ROOF OF A MOTOR VEHICLE

CROSS REFERENCE TO RELATED APPLICATIONS

The present application is a national stage application of International Application No. PCT/EP2021/085077, filed Dec. 9, 2021, which claims priority to German Patent Application No. 102020133147.9, filed Dec. 11, 2020, the entire contents of which are incorporated herein by reference in their entirety.

The invention relates to a roof rail for a motor vehicle, having at least one gallery bar and at least one fastening device for fastening the end of the gallery bar to a roof of the motor vehicle, the fastening device having a fastening element in the form of an extruded part and a cover which receives the fastening element at least in regions. The invention further relates to a motor vehicle having a roof and a roof rail attached to the roof, and to a method for mounting a roof rail on a roof of a motor vehicle.

From prior art document WO 2013/107683 A1 is known, for example. This document describes a roof rail for a motor vehicle, with at least one gallery bar and with at least one support element fastened to the gallery bar for bridging a distance formed between the gallery bar and the roof of the motor vehicle and for fixing the roof rail to the roof of the motor vehicle, and with at least one cover for the support element, the gallery bar, support element and cover being designed as separate components. It is provided that at least one end region of the gallery bar is formed as a curved section, the end face of which forms a roof contact end, that the support element is formed as an extruded part and that the support element and cover are located at least partially in the region of the curved section.

It is an objective of the invention to propose a roof rail for a motor vehicle which provides advantages over known roof rails, in particular which can be fixed to the roof of the motor vehicle in a very reliable and durable manner and which has a very pleasing visual design.

This is achieved according to the invention with a roof rail for a motor vehicle comprising the features of claim 1. It is provided that the fastening element rests against the cover on its side facing away from the gallery bar, in particular as seen in longitudinal section.

Advantageous arrangements with expedient embodiments of the invention are indicated in the dependent claims.

The roof rail is preferably part of the motor vehicle, but can of course also be separate from it. The roof rails are used, for example, to attach a roof rack to the motor vehicle. In this case, the roof rack is supported on the roof of the motor vehicle via the roof rails. However, the roof rails can of course also be arranged on the motor vehicle for purely visual reasons.

The roof rail comprises at least the at least one gallery bar and the at least one fastening device. The gallery bar is understood to be a component of the roof rail which, after the roof rail has been mounted on the motor vehicle, preferably extends in the longitudinal direction of the motor vehicle or at least approximately in the longitudinal direction, therefore is arranged parallel or approximately parallel to a longitudinal axis of the motor vehicle. In this case, the gallery bar extends over a substantial part of an extension of the roof in the direction of the longitudinal axis, preferably over at least 70%, at least 80% or at least 90%. However, other orientations and extensions of the gallery bar are also possible in principle.

For example, the gallery bar is designed in such a way that it is supported on the roof of the motor vehicle over at least a large part of its longitudinal extension, in particular continuously or uninterruptedly, after the roof rail has been mounted on the motor vehicle. Preferably, the gallery bar is supported on the roof of the motor vehicle over its entire longitudinal extent. However, it is also possible for the gallery bar to be supported on the roof of the motor vehicle only in certain areas, in particular only at the ends by means of the fastening device or by means of several fastening devices. It is also possible that the gallery bar is supported at the end on the roof by means of the fastening devices and is only spaced from the roof in certain areas between the fastening devices. The roof rails presented here can basically be used for all the aforementioned designs of the gallery bar.

The gallery bar is preferably supported on the roof by means of a protective foil, in particular made of plastic, in particular of an elastomer and/or a foam, which reliably prevents damage to the roof by the roof rail or, conversely, damage to the roof rail by the roof and/or creates a water-proof connection between the roof rail and the roof of the motor vehicle, so that penetration of moisture from an external environment into the motor vehicle via the roof rail or via an attachment of the roof rail to the roof is prevented. The protective foil can be regarded as an integral part of the roof for the purposes of this description. Therefore, as far as it is mentioned that the roof rails are supported on the roof, this can be done directly without the protective foil or preferably via the protective foil. In the former case, the roof rails rest directly on the roof, in the latter case on the protective foil arranged on the roof.

The gallery bar is fastened or can be fastened at the end to the roof of the motor vehicle with the aid of the at least one fastening device. The term "fastening at the end" means that the fastening device engages one end of the gallery bar and connects it to the roof of the motor vehicle. In other words, the fastening device is arranged at one end of the gallery bar or fastened to it. The fastening means that the gallery bar is completely fixed by means of the fastening device, that is, in the direction of a longitudinal axis, a vertical axis and a transverse axis of the motor vehicle, and allows or permits no slackness or at most a slight slackness between the gallery bar and the roof.

Particularly preferably, the gallery bar is fastened to the roof of the motor vehicle with several fastening devices. Each of the fastening devices serves to fasten the gallery bar at the end to the roof, so that the several fastening devices act on spaced ends of the gallery bar and fix it with respect to the roof. A region of the gallery bar present between the regions of the gallery bar fastened by means of the fastening devices is supported, for example, at least in regions, preferably continuously or only in regions, on the roof of the motor vehicle or is continuously spaced from the roof. In any case, the gallery bar is supported on the roof at least at the ends via the fastening devices, in particular the gallery bar itself rests there on the roof of the motor vehicle or on the protective foil.

Particularly preferably, the roof rails have several gallery bars which are arranged on the roof of the motor vehicle, in particular spaced parallel to each other. Each of these gallery bars is fastened at the end to the roof of the motor vehicle by means of at least one fastening device. Preferably, several fastening devices are used for fastening each of the gallery bars, in particular exactly two fastening devices. In this respect, the invention also relates to a roof rail for a motor vehicle, having at least one gallery bar and a plurality of fastening devices for respectively fastening the gallery bar at the end to a roof of the motor vehicle, each of the fastening devices having a fastening element which is in the form of an extruded part and a cover which receives the fastening element at least in regions. It is again provided that the fastening element rests against the cover on its side facing away from the gallery bar.

The fastening element is basically designed as an extruded part, that is, produced by extrusion. This means that the fastening element has a continuously constant cross-section in one direction, namely in an extrusion direction in which the extruded part is produced by extrusion. Preferably, the extrusion process is first used to produce a blank, which is divided into several fastening elements, which are in particular identical, by separating them in planes arranged parallel to one another. The design of the fastening element as an extruded part enables a particularly high strength with low manufacturing costs at the same time. Particularly preferably, the fastening element is made of aluminium or an aluminium alloy. Particularly preferably, the material EN AW-6060, in particular EN AW-6060-T66, is used for the fastening element. Additionally or alternatively, the material is made according to DIN EN 573-3 T66 and/or according to DIN EN 755-2. The material can also be designated as 3.3206.

Since the fastening element, due to its design as an extruded part, can only be adapted in one direction to a contour of the roof and the gallery bar, the fastening device comprises the cover in addition to the fastening element, the cover can also be referred to as an adapter. For example, it is intended that identically designed fastening elements are used for a plurality of roof rails, whereby these in particular have differently designed gallery bars. Each of the roof rails has covers which adapt the identical fastening elements to the different gallery bars. Accordingly, the fastening element can be produced in large quantities, resulting in a particularly significant cost advantage.

The cover is preferably made of plastic and is produced in particular by plastic injection moulding, therefore it is an injection-moulded part. This results in a high degree of flexibility in the design of the cover, so that the fastening device is adapted extremely precisely to the gallery bar and/or the roof despite the design of the fastening element as an extruded part. As a result, on the one hand a high strength of the connection between the gallery bar and the roof is achieved, namely due to the use of the fastening element, and on the other hand a particularly pleasing visual impression of the roof rail is achieved. Preferably, it is provided that the cover is manufactured in one piece and as a single material, in particular by injection moulding. In this respect, the cover does not consist of several parts which are fastened to each other, for example in a form-fitting and/or material-fitting manner. Rather, the cover is already manufactured in one piece, that is, as a single element. This also leads to a cost-effective and efficient production.

In conventional roof rails, only the fastening element serves to support and fasten the gallery bar, whereas the cover—if present at all—only serves to visually conceal the fastening element. According to the invention, however, the cover also has a supporting effect, in particular the fastening element and, consequently, also the gallery bar is supported on the roof of the motor vehicle via the cover. Accordingly, the roof rail is designed in such a way that the side of the fastening element facing away from the gallery bar rests against the cover, so that after the roof rail has been mounted on the roof, the cover is present between the fastening element and the roof and is held there, in particular in a clamped manner.

The fastening element has a side facing the gallery bar in the direction of a vertical axis of the motor vehicle and a side facing away from the gallery bar. In addition, the gallery rod has an upper side facing away from the motor vehicle, in particular in the direction of a vertical axis of the motor vehicle or as seen in longitudinal section. The side facing the gallery bar is arranged above the side facing away from the gallery bar in the direction of the vertical axis. In other words, when the roof rail is arranged on the roof of the motor vehicle as intended, the side facing the gallery bar is equal to the side facing away from the roof and facing an external environment. Conversely, in this case, the side facing away from the gallery bar is equal to the side facing the roof and the side facing away from the external environment, in each case as seen in longitudinal section. In this respect, the fastening element is in contact with the cover on its side facing the roof of the motor vehicle. Alternatively, the fastening element rests against the cover on its side facing away from the upper side of the gallery bar. In another formulation, the fastening element is in contact with the cover on its underside when viewed in longitudinal section and when the roof rails are arranged as intended.

It is therefore intended that the gallery bar is fastened to the fastening element, whereby the fastening element in turn is supported on or fastened to the roof of the motor vehicle after the roof rails have been mounted on the motor vehicle. It may be envisaged that the fastening element is supported exclusively directly on the roof of the motor vehicle, that is, is in direct contact with the roof or the protective foil. Preferably, however, the fastening element is at least partially supported on the roof via the cover. Particularly preferably, at least a large part of the fastening element is spaced from the roof by means of the cover, so that at most a small part of the fastening element is supported directly on the roof or the protective foil, whereas the rest of the fastening element is supported on the roof or the protective foil exclusively via the cover. This reliably prevents damage to the roof by the fastening element.

A further embodiment of the invention provides that the cover has a fastening element receptacle, in which the fastening element is arranged in such a way, that it rests against a fastening element receptacle base, which marks the boundary of the fastening element receptacle in the direction facing away from the gallery bar and is formed by the cover. The fastening element receptacle is formed on the side facing the gallery bar and thus on the side of the cover facing away from the roof. The fastening element receptacle extends through the cover only in certain areas, so that it is delimited by the fastening element receptacle base, which is also formed by the cover. In this respect, the fastening element receptacle is a recess formed in the cover.

The fastening element is arranged at least in part in the fastening element receptacle. In this case, it rests against the fastening element receptacle base and is supported by it. The abovementioned contact of the fastening element with the cover on its side facing away from the gallery bar is particularly preferably understood to mean the contact of the fastening element with the fastening element receptacle base. The fastening element receptacle is preferably adapted in shape and/or dimension to the fastening element. In particular, the fastening element receptacle and the fastening element are designed in such a way that spaced-apart, parallel side surfaces of the fastening element lie flat against edges bounding the fastening element receptacle, namely permanently in each case. As a result, the fastening element is reliably held with respect to the cover in at least one direction, in particular in the direction of a transverse axis of the motor vehicle. In any case, the arrangement of the fastening element in the fastening element receptacle ensures that the cover and the fastening element are reliably fixed against each other.

A further embodiment of the invention provides that the fastening element arranged in the fastening element receptacle, on the one hand, rests against the fastening element receptacle base and, on the other hand, is aligned at least in some areas with an edge delimiting the fastening element receptacle, preferably over at least 50%, at least 60% or at least 70% of its longitudinal extent. The edge marks the boundary of the fastening element receptacle in the direction of the gallery bar or in the direction facing away from the roof of the motor vehicle. The edge is circumferential and continuous, that is, uninterrupted. Particularly preferably, the edge is part of a support surface which marks the boundary of the cover in the direction of the gallery bar and is adapted in shape to the fastening element, and on which the gallery bar is supported in a preferred embodiment. In this case, the support surface serves to support the gallery bar in the direction of the roof. However, it can also be provided that the gallery bar does not rest against the support surface and is arranged at a distance from it. In this case, the supporting surface can be referred to, for example, as the enveloping surface of the cover.

Preferably, the support surface closes the cover in the direction of the gallery bar. The cover therefore does not have any areas that protrude beyond the support surface. The support surface is adapted to the shape of the fastening element and in particular curved in exactly one direction, whereas it runs continuously straight in a direction perpendicular to this direction. On the one hand, the fastening element now rests against the fastening element receptacle base. On the other hand, that is on its side facing the gallery bar, it is aligned with the edge and/or the supporting surface over at least part of its longitudinal extent, in particular over a predominant part of its longitudinal extent. The alignment is thus present over at least 50% of the longitudinal extension of the fastening element, but preferably over a greater extension, for example over at least 60% or over at least 70% of its longitudinal extension.

A further embodiment of the invention provides that the fastening element has a first fastening recess and a second fastening recess, wherein the first fastening recess is provided and designed for receiving a first screw connector serving to fasten the fastening element to the gallery bar and the second fastening recess is provided and designed for receiving a second screw connector serving to fasten the fastening element to the roof. The fastening element has at least the two fastening recesses, namely the first fastening recess and the second fastening recess, preferably exclusively the first fastening recess and the second fastening recess. The fastening recesses are designed as through-holes, that is, they pass completely through the fastening element.

The first screw connector is arranged in the first fastening recess, by means of which the fastening element is fastened to the gallery bar. In the second fastening recess, on the other hand, the second screw connector is arranged, by means of which the fastening element can be fastened or is fastened to the roof. The two fastening recesses are preferably arranged parallel to each other and spaced apart. This means that a longitudinal centre axis of the first fastening recess runs parallel to a longitudinal centre axis of the second fastening recess.

The screw connectors, that is the first screw connector and the second screw connector, are preferably screws or bolts. Accordingly, each of the screw connectors has at least one screw connector head and a screw connector thread. Particularly preferably, the first fastening recess is a threaded recess. Thus, a thread is formed on the fastening element in the first fastening recess. This thread cooperates with the screw connector thread of the first screw connector to retain the first screw connector in the first fastening recess. In other words, the first screw connector is screwed into the first fastening recess. Particularly preferably, the fastening element is attached to the gallery bar exclusively by means of the first screw connector and also exclusively to the roof by means of the second screw connector. In this way, a certain compensating movement is allowed by means of the fastening element or a spring effect is achieved, so that the gallery bar is held permanently and reliably on the roof.

A further embodiment of the invention provides that the fastening element, viewed in longitudinal section, rests against the cover between the first fastening recess and the second fastening recess. In this respect, the fastening element has a contact surface which, viewed in longitudinal section, is arranged between the two fastening recesses. This contact surface rests against the cover, which has a counter contact surface. The contact surface and the counter contact surface are in contact with each other over their entire surface—and therefore not just at certain points or along a line—so that reliable support of the fastening element on the cover is ensured.

A further embodiment of the invention provides that the first fastening recess and the second fastening recess each completely reach through the fastening element. The design of the two fastening recesses as pass-through recesses has already been mentioned. Such a design of the fastening element is simple and inexpensive to implement. For example, the fastening recesses are machined by drilling, that is, they are in the form of holes.

A further embodiment of the invention provides that the fastening element has a base element which rests against the cover, and, on the one hand, a gallery bar connecting element extending from the base element, said gallery bar connecting element projecting beyond the base element in the direction of the gallery bar and receiving the first fastening recess and, on the other hand, a roof connecting element extending from the base element, said roof connecting element being offset in the direction facing away from the gallery bar and receiving the second fastening recess, wherein the roof connecting element reaches at least partially, in particular completely, through a pass-through opening of the cover in the direction facing away from the gallery bar.

The gallery bar connecting element serves to connect the fastening element to the gallery bar and the roof connecting element serves to connect the fastening element to the roof of the motor vehicle. After the intended installation of the roof rail on the motor vehicle, the fastening element is thus fastened to the gallery bar via the gallery bar connecting element and to the roof via the roof connecting element. For the respective fastening, the gallery bar fastening element has the first fastening recess and the roof fastening element has the second fastening recess. The gallery bar connecting element and the roof connecting element are arranged at a distance from each other and are connected to each other via the base element.

The base element rests against the cover and in this respect has the contact surface which rests flat against the counter contact surface of the cover. At least the roof connection element does not rest against the cover on its side facing away from the gallery bar or facing the roof, but is arranged in the pass-through opening of the cover. The pass-through opening completely penetrates the cover in the direction facing away from the gallery bar, so that the pass-through opening is open in the direction of the roof. This ensures a reliable fastening of the fastening element to the roof, as a force acting between the fastening element and the roof is transmitted directly, therefore not only indirectly via the cover.

A further embodiment of the invention provides that the roof connecting element protrudes from the pass-through opening on the side facing away from the gallery bar, in particular protrudes over the cover. The roof connecting element is thus designed to be supported directly on the roof after the roof rail has been mounted on the motor vehicle. Preferably, the roof connecting element protrudes beyond the cover, so that no deformation of the cover, in particular no compression of the cover, occurs when the fastening element is fastened to the roof by means of the second screw connector.

A further embodiment of the invention provides that the cover has a blind recess on its side facing away from the gallery bar, into which the second fastening recess opens and the base of which formed by the cover forms an edge continuously marking the boundary of the second fastening recess. The blind recess only partially penetrates the cover, preferably in the direction of a longitudinal centre axis of the second fastening recess by at most 30%, at most 40% or at most 50%. Preferably, the blind recess is bounded by a continuous edge in a plane perpendicular to said longitudinal central axis. For example, the blind recess is polygonal, in particular rectangular, or round when viewed in cross-section.

The blind recess is bounded by the base in the direction of the gallery bar. This base is forming the edge which continuously bounds or continuously surrounds the second fastening recess. In radial direction with respect to the longitudinal centre axis of the second fastening recess, the blind recess preferably has dimensions which are at least 50%, at least 75% or at least 100% larger than the dimensions of the roof connecting element in the same direction. This ensures sufficient flexibility of the cover in the area of the second screw connector.

A further embodiment of the invention provides that the roof connecting element comprises a projection over the base element which is at least equal to or greater than a wall thickness of the cover in the region of the blind bag recess and/or a wall thickness of the fastening element receptacle base. The advantages of such an arrangement have already been pointed out in the context of this description.

A further embodiment of the invention provides that the fastening element has a support extension resting on the cover, which extends from the roof connection element on the side facing away from the base element, is offset from the roof connection element in the direction facing the base element when viewed in longitudinal section, and the fastening element resting against the cover in a supporting manner. The fastening element thus additionally comprises the support extension, which serves to support the fastening element with respect to the cover. The support is provided—seen in longitudinal section—on the side of the roof fastening element facing away from the base element. In this way, a force exerted by the second screw connector on the fastening element during or after the installation of the roof rail on the motor vehicle is evenly applied to the cover, which in turn reliably supports the fastening element and thus effectively prevents the fastening element from tilting.

A further embodiment of the invention provides that the roof connecting element is U-shaped when viewed in longitudinal section, so that it forms a screw connector base receptacle for the form-fitting reception of a screw connector base of the second screw connector. Due to the U-shape of the roof connecting element, it is offset relative to the base element of the fastening element. More precisely, the roof connecting element has several legs, with the second fastening recess being formed in one of the legs. This leg is connected to the base element on the one hand and to the support extension on the other hand via two further legs. These two legs are arranged at a distance from each other, namely in such a way that, viewed in longitudinal section, the screw connector base receptacle is located between them.

The second fastening recess opens into the screw connector base receptacle, namely on its side facing the gallery bar or on its side facing away from the roof. The screw connector base receptacle is provided and designed to positively receive the screw connector base of the second screw connector. The screw connector base is to be understood as a preferably polygonal, in particular square or rectangular, body of the second screw connector, which preferably follows a screw connector head. The screw connector base can also be referred to as a screw lug or bolt lug.

The screw connector base receptacle and the screw connector base are designed in such a way that, after the roof rail has been mounted on the motor vehicle, the screw connector base is present in the screw connector base receptacle and is held there in a form-fitting manner in the circumferential direction with respect to a longitudinal centre axis of the second screw connector. In other words, the second screw connector is held in a rotationally fixed manner with respect to the fastening element by means of the screw connector base and the screw connector base receptacle. This enables a simple assembly of the roof rail or a simple fastening of the fastening element to the roof of the motor vehicle, in particular by screwing a screw nut onto the second screw connector. The second screw connector passes through a recess formed in the roof. On the side of the roof facing away from the roof rail, that is inside the motor vehicle, the screw nut is screwed onto the second screw connector so that the roof is held between the screw nut and the fastening element, in particular in a clamping manner.

A further embodiment of the invention provides that the fastening element has a recess in the form of a screw connector head receptacle on its side facing the gallery bar, in which a screw connector head of the second screw connector is arranged. The screw connector head receptacle is preferably directly adjacent to the screw connector base receptacle. For example, it has only a small depth. In particular, its depth is at most 5%, at most 2.5% or at most 1% of a depth of the screw connector base receptacle. The screw connector head receptacle enables simple and error-free positioning of the screw connector head of the second screw connector.

A further embodiment of the invention provides that the gallery bar connecting element forms a counter holder for a bottom wall of the gallery bar on the side facing away from the gallery bar, and the bottom wall is held positively between the counter holder and a screw connector head of the first screw connector. To fasten the gallery bar to the fastening element, the fastening element is thus inserted into the gallery bar so that the bottom wall of the gallery bar rests against the counter holder. Then the first screw connector is arranged in the first fastening recess and connected or screwed to the fastening element. This is done in such a way that the screw connector head of the first screw connector presses the bottom wall of the gallery bar against the gallery bar connecting element or its counter holder and holds it against it. Such a design of the roof rail enables a quick and easy fastening of the gallery bar to the fastening element.

A further embodiment of the invention provides that, viewed in longitudinal section, the roof connecting element extends at least as far in the direction facing away from the gallery bar as the first screw connector. Preferably, the roof rail is designed in such a way that after mounting to the roof of the motor vehicle, both the roof connecting element and the first screw connector are supported on the roof or the protective foil. This reliably prevents the first screw connector from loosening.

A further embodiment of the invention provides that, viewed in longitudinal section, the gallery bar connecting element projects beyond the base element of the fastening element. In this respect, the gallery bar connecting element projects beyond the base element in both directions, that is, in the direction of the gallery bar as well as in the direction of the roof of the motor vehicle, so that it forms two projections extending in opposite directions. As a result, the fastening element and the cover are reliably fastened to each other with a positive fit.

A further embodiment of the invention provides that the cover has a further pass-through opening into which the first fastening recess opens and/or into which the gallery bar connecting element engages, so that the first screw connector is arranged at least in part in the further pass-through opening. In addition to the pass-through opening, the cover thus has the further pass-through opening, which also completely penetrates the cover. The further pass-through opening is arranged in such a way that the first fastening recess opens into it. Preferably, the gallery bar connecting element also engages in the further pass-through opening, so that the cover is positively fixed with respect to the fastening element, at least in the longitudinal direction. In each of the described embodiments, the first screw connector engages in the further pass-through opening. This ensures a simple and quick fastening of the fastening element and the cover to the gallery bar.

A further embodiment of the invention provides that the fastening element and the cover are hooked into a recess at the end of the gallery bar so that the bottom wall rests against the counter holder of the fastening element and the cover. The recess of the gallery bar is formed, for example, by a recess in the bottom wall. Accordingly, an upper side of the gallery bar completely overlaps the recess. The fastening element and the cover are preferably hooked into the recess of the gallery bar in such a way that the bottom wall rests against both the counter holder and the cover. In addition, the upper side of the gallery bar is preferably supported on the cover, which comprises a form-fitting support contour for this purpose. Accordingly, a reliable and visually attractive connection of the gallery bar to the roof of the motor vehicle is realised.

A further embodiment of the invention provides that a form-fitting retaining device is arranged on the fastening element, which device cooperates in a form-fitting manner with a form-fitting retaining counter device of a hold-down engaging over the second fastening recess on the side of the gallery bar, the hold-down having, on its side facing away from the form-fitting retaining counter device, a retaining device which cooperates in a form-fitting manner with a retaining counter device of the cover, so that the hold-down is held in a latching manner on the fastening element and the cover.

The hold-down serves to fasten the second screw connector to the fastening element and the cover. For this purpose, the second screw connector is arranged in the second fastening recess and then the hold-down is arranged over the second screw connector, in particular over a screw connector head of the second screw connector. This is done in such a way that the hold-down presses the second screw connector against the fastening element, in particular into the screw connector head receptacle. Preferably, the hold-down has a projection projecting in the direction of the second screw connector, which rests against the second screw connector or even engages in a driving profile of the second screw connector, for example in a slotted driving profile, a cross-slotted driving profile or a hexagon socket driving profile.

Seen in longitudinal section, the hold-down is held form-fittingly on opposite sides of the second screw connector on the fastening element or the cover. The form-fitting retaining counter device and the retaining device are used for this purpose. The form-fitting retaining counter device interacts form-fittingly with the form-fitting retaining device of the fastening element and the retaining device interacts form-fittingly with the retaining counter device of the cover. For example, the form-fitting retaining device is in the form of a form-fitting recess, in particular an insertion recess, while the form-fitting retaining counter device is in the form of a form-fitting projection or insertion projection. The retaining device is preferably designed as a latching projection and the retaining counter device as a latching recess. Such a design enables rapid fastening of the hold-down to the fastening element and the cover.

The invention further relates to a motor vehicle with a roof and a roof rail mounted to the roof, in particular a roof rail according to the embodiments within the scope of this description, wherein the roof rail has at least one gallery bar and at least one fastening device for fastening the gallery bar at the end to the roof of the motor vehicle, wherein the fastening device has a fastening element in the form of an extruded part and a cover receiving the fastening element at least in certain regions. It is provided that the fastening element rests against the cover on its side facing away from the gallery bar, so that the cover is held clamped between the fastening element and the roof.

The advantages of such a design of the motor vehicle and the roof rail have already been discussed. Both the motor vehicle and the roof rail can be further designed in accordance with the explanations in this description, so that reference is made to this.

The invention also relates to a method for mounting a roof rail on a roof of a motor vehicle, in particular a roof rail in accordance with the embodiments within the scope of this description, wherein the roof rail has at least one gallery bar and at least one fastening device for fastening the gallery bar at the end to a roof of the motor vehicle, wherein the fastening device has a fastening element in the form of an extruded part and a cover which receives the fastening element at least in certain regions. In this case, it is provided that the fastening element is arranged to rest against the cover on its side facing away from the gallery bar, so that the cover is held clamped between the fastening element and the roof.

Once again, reference is made to the explanations within the scope of this description regarding the advantages and possible advantageous further embodiments.

The features and combinations of features described in the description, in particular the features and combinations of features described in the following figure description and/or shown in the figures, can be used not only in the respective combination indicated, but also in other combinations or on their own, without leaving the scope of the invention. Thus, embodiments which are not explicitly shown or explained in the description and/or the figures, but which result from the explained embodiments or can be derived from them, are also to be regarded as within the scope of the invention.

Figure 2:
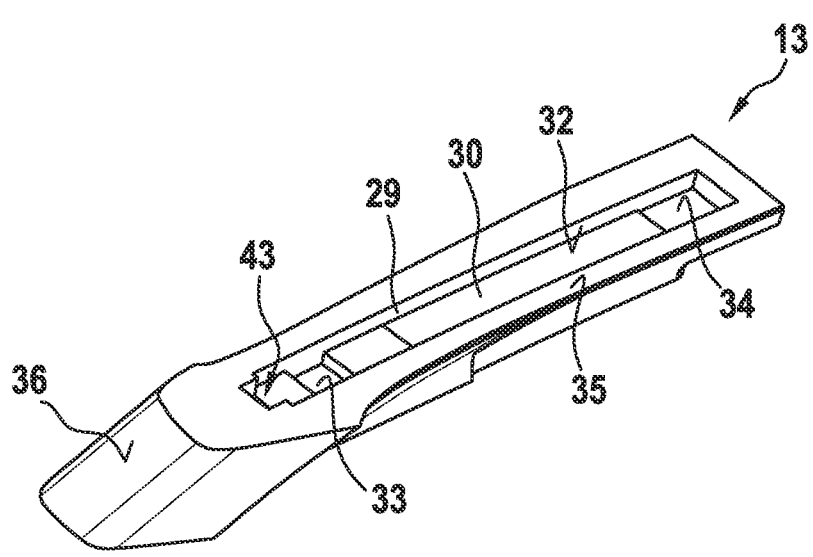
Figure 3:
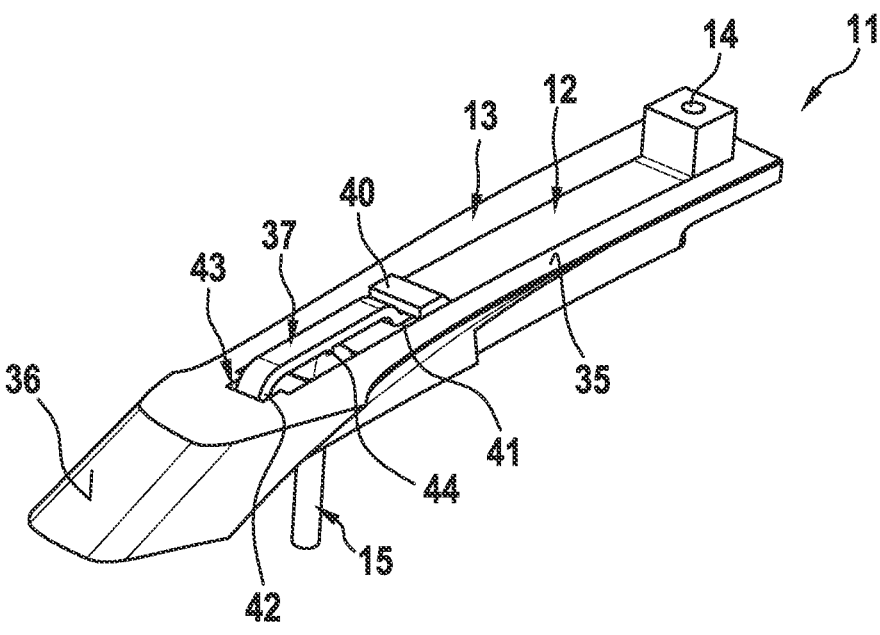
Figure 4:
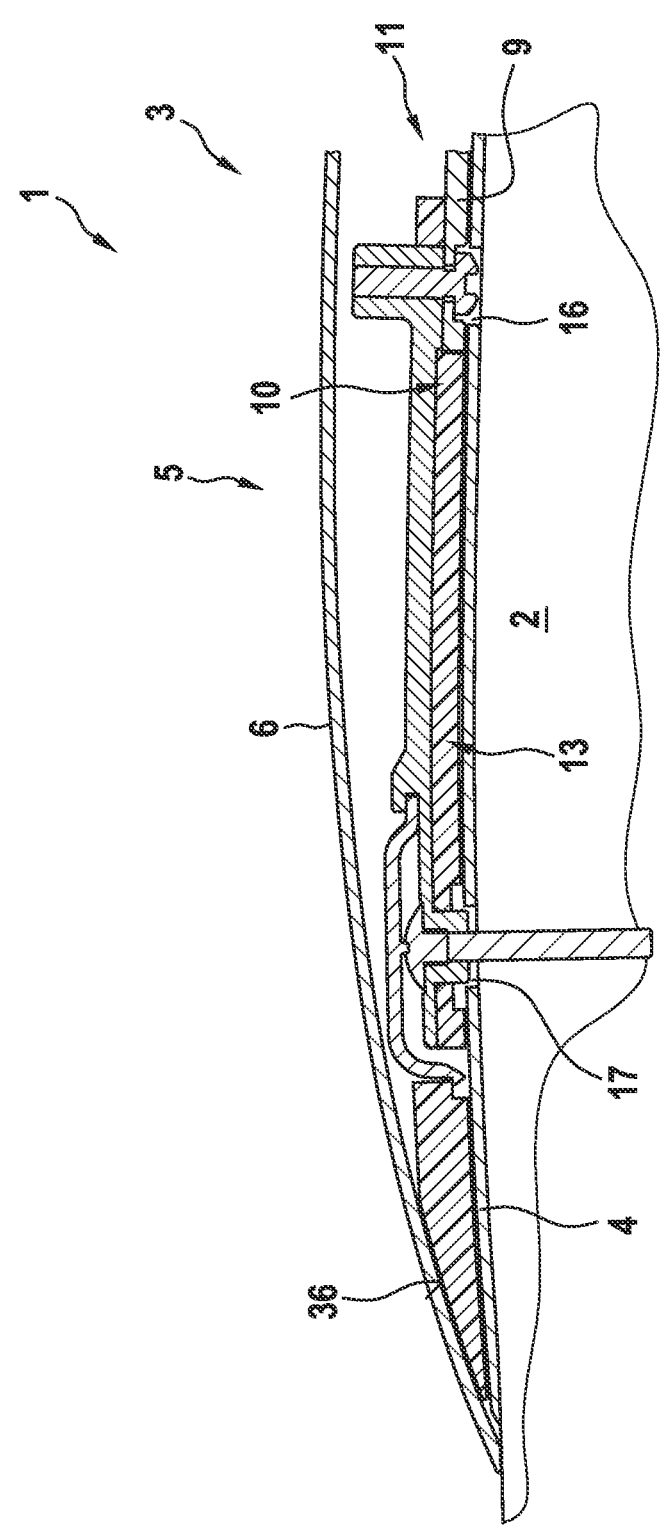

The invention is explained in more detail below with reference to the embodiments shown in the drawing, without any limitation of the invention. Thereby shows:

FIG. 1 a schematic representation of a portion of a motor vehicle having a roof and a roof rail mounted to the roof, the roof rail having at least one gallery bar and a fastening device for mounting the gallery bar to the roof, FIG. 2 a schematic representation of a cover of the fastening device, FIG. 3 a schematic representation of the fastening device, which comprises a fastening element in addition to the cover, and FIG. 4 a schematic longitudinal sectional view through an area of the motor vehicle.

FIG. 1 shows a schematic representation of a region of a motor vehicle 1 which has a roof 2 and a roof rail 3. The roof rail 2 is mounted to the roof. A protective foil 4 is arranged between the roof 2 and the roof rail 3 to prevent mutual damage to the roof 2 and the roof rail 3. The protective foil 4 can also be considered as part of the roof 2, so that the roof 2 comprises the protective foil 4 in regions, namely where the roof rail 3 is supported on or touches the roof 2. The roof rail 3 comprises a gallery bar 5. In principle, the roof rail 3 can have any number of gallery bars 5. In this case, the plurality of gallery bars 5 preferably run parallel to each other. In the following, only the gallery bar 5 will be discussed. If there is a plurality gallery bars 5, the explanations can be applied analogously to each of these gallery bars 5.

On its side facing away from the roof 2, the gallery bar 5 comprises an upper side 6 which is curved towards the roof 2 in the direction of one end 7. Side walls 8 extend from the upper side 6, of which only one is visible here. The side walls 8 run parallel to each other and preferably extend over a large part of the extension of the gallery bar 5. Downwards, the gallery bar 5 is at least partially bounded by a bottom wall 9, which is connected to the upper side 6 via the side walls 8. The bottom wall 9 has a smaller extension in the longitudinal direction of the roof rail 3 than the upper side 6 and the side walls 8. This forms a recess 10 in the area of the end 7 which is not visible here. A fastening device 11 engages in the recess 10 and is arranged at the end of the gallery bar 5.

The fastening device 11 serves to fasten the gallery bar 5 at the end to the roof 2 of the motor vehicle 1. The fastening device 11 has a fastening element 12 and a cover 13. Both the fastening element 12 and the cover 13 are manufactured in one piece and as a single material. While the fastening element 12 is an extruded part, the cover 13 is an injection moulded part and is accordingly manufactured by injection moulding. The fastening element 12 is preferably made of metal, in particular of aluminium or an aluminium alloy. The cover 13 is made of a material which is different from the material of the fastening element 12, in particular has a lower strength. Preferably, the cover 13 is made of plastic, for example a thermoplastic.

The fastening element 12 is attached to the gallery bar 5 by means of a first screw connector 14 and to the roof 2 of the motor vehicle 1 by means of a second screw connector 15. It can be seen that the protective foil 4 comprises recesses 16 and 17 for the screw connectors 14 and 15. The fastening element 12 comprises a first fastening recess 18 and a second fastening recess 19 which is not visible here. After the roof rail 3 has been mounted on the roof 2 of the motor vehicle 1, the first screw connector 14 is arranged in the first fastening recess 18 and the second screw connector 15 is arranged in the second fastening recess 19.

The fastening element 12 comprises a base element 20. Viewed in the longitudinal direction, a gallery bar connecting element 21 extends from the base element 20 on one side and a roof connecting element 22 extends from the base element 20 on the other side. The first fastening recess 18 is formed in the gallery bar connecting element 21 and the second fastening recess 19 is formed in the roof connecting element 22. The gallery bar connecting element 21 projects beyond the base element 20 both in the direction of the gallery bar 5 and in the direction facing away from the gallery bar 5, so that projections forming the gallery bar connecting element 21 extend from the base element 22 in this respect. The roof connecting element 22 is offset in the direction facing away from the gallery bar 5 or projects in this direction over the base element 20. Preferably, the roof connecting element 22 projects further in the direction away from the gallery bar 5 beyond the base element 20 than the gallery bar connecting element 21.

The roof connecting element 22 is U-shaped when viewed in longitudinal section. Accordingly, it has legs 23, 24 and 25, the leg 23 being connected to the base element 20 and a support extension 26 via the legs 24 and 25. The legs 24 and 25 run parallel to each other and each extend from the leg 23. They are arranged at a distance from each other so that there is a screw connector base receptacle 27 between them. The second fastening recess 19, which is formed in the leg 23 and extends completely through it, also opens into this recess. In the area of the legs 24 and 25, the fastening element 12 has a recess which is designed as a screw connector head receptacle 28.

The cover 13 comprises a fastening element receptacle 29, which is bounded by a fastening element receptacle base 30 in the direction facing away from the gallery bar 5. The fastening element 12 is supported by a contact surface 31 on the fastening element receptacle base 30, which in this respect forms a counter contact surface 32. A pass-through opening 33 and a further pass-through opening 34 extend from the fastening element receptacle base 29. The pass-through opening 33 and the pass-through opening 34 completely penetrate the cover 13 or the fastening element receptacle base 30 in the direction of the roof 2.

The roof connecting element 22 is arranged in the pass-through opening 33; the gallery bar fastening element 21 engages in the pass-through opening 34 in certain areas. The gallery bar connecting element 21, the roof connecting element 22, the pass-through opening 33 and the pass-through opening 34 are dimensioned in such a way that the fastening element 12 is held form-fittingly in the fastening element receptacle 29. The fastening element receptacle 29 is enclosed by a continuous edge 35. Away from the fastening element receptacle 29, the cover 13 preferably has a support contour 36, which is adapted in shape and dimension to an inner side of the gallery rod 5, so that the support contour 36 supports the end 7 of the gallery rod by resting flatly on the inside against the end 7 of the gallery rod 5.

In addition to the elements already explained, the roof rail 3 has a hold-down 37 which engages over the second screw connector 15 after the roof rail 3 has been mounted on the roof 2 and thereby holds it in the second fastening recess 19. This prevents a screw connector base 38 from getting out of the screw connector base receptacle 27 and a screw connector head 39 from getting out of the screw connector head receptacle 28. The hold-down 37 is preferably fastened to the fastening element 12 and the cover 13 in a latching manner. For this purpose, a form-fitting retaining device 40 is formed on the fastening element 12, which interacts form-fittingly with a form-fitting retaining counter device 41 of the hold-down 37.

On its side facing away from the form-fitting retaining counter device 41 in longitudinal section, a retaining device 42 is formed on the hold-down 37, which interacts in a latching manner with a retaining counter device 43 formed on the cover 13. The hold-down 37 has a projection 44 projecting in the direction of the second screw connector 15, which is designed in such a way that it rests against the screw connector head 39 after the roof rail 3 has been mounted to the roof 2, thereby holding the second screw connector 15 in the second fastening recess 19. In addition, the projection 44 can be adapted to the shape of a driving profile of the second screw connector 15 and engage in it so that it holds the second screw connector 15 in a rotationally fixed manner.

FIG. 2 shows a schematic representation of the cover 13. The pass-through opening 33 and 34 can now be clearly seen, each of which completely penetrates the fastening receptacle base 30. The further explanations on the cover 13 in the context of this description are referred to in full.

FIG. 3 shows a schematic representation of the fastening device 11 with screw connectors 14 and 15 arranged thereon. It is now particularly clear how the hold-down 37 is fastened to the fastening element 12 and the cover 13. It can also be seen that the fastening element 12 is flush with the edge 35 of the cover 13.

FIG. 4 shows a longitudinal sectional view through an area of the motor vehicle 1, again showing the roof rail 3 with the gallery bar 5 and the fastening device 11 as well as the roof 2 of the motor vehicle 1. The recess 10, which is formed at the end in the gallery bar 5 and in which the fastening device 11 engages, can be seen. Preferably, the fastening element 12 is completely accommodated in the gallery bar 5. The cover 13 is designed in such a way that, in the longitudinal direction of the gallery rod 5, it completely bridges a distance between one end of the bottom wall 9 and one end of the top side 6 of the gallery rod 5, so that the cover 13 rests on the one hand against the top side 6 and on the other hand against the bottom wall 9 and accordingly closes the recess 10, in particular completely. Preferably, the side walls 8 lie against the cover 13 on opposite sides. It is particularly preferred that the cover 13 rests on the base wall 9 and that the upper side 6 is supported on the cover 13, namely on the support contour 36. The fastening element 12 and the cover 13 are thus suspended in the recess 10 of the gallery bar 5 and fastened there.

The described design of the motor vehicle 1, in particular of the roof rail 3, enables a particularly reliable, cost-effective and visually appealing mounting of the gallery bar 5 to the roof 2 of the motor vehicle 1. This is realised in particular by manufacturing the fastening element 12 as an extruded part and using the cover 13 as an adapter. In this case, the fastening element 12 ensures sufficient strength of the fastening device 11, whereas by means of the cover 13—without modifying the fastening element 12—an adaptation to different gallery bars and/or to different roofs 2 is achieved.

LIST OF REFERENCE SIGNS

1 Motor vehicle
2 Roof
3 Roof rail
4 Protective foil
5 Gallery bar
6 Top
7 End
8 Side wall
9 Bottom wall
10 Recess
11 Fastening device
12 Fastening element
13 Cover
14 First screw connector
15 Second screw connector
16 Recess
17 Recess
18 First fastening recess
19 Second fastening recess
20 Base element
21 Gallery bar connecting element
22 Roof connecting element
23 Leg
24 Leg
25 Leg
26 Support extension
27 Screw connector base receptacle
28 Screw connector head receptacle
29 Fastening element receptacle
30 Fastening element receptacle base
31 Contact surface
32 Counter contact surface
33 Pass-through opening
34 Pass-through opening
35 Edge
36 Support contour
37 Hold-down
38 Screw connector base
39 Screw connector head
40 Form-fitting retaining device
41 Form-fitting retaining counter device
42 Retaining device
43 Retaining counter device
44 Projection

The invention claimed is:

1. A roof rail for a motor vehicle, comprising:

at least one gallery bar and at least one fastening device for fastening an end of the gallery bar to a roof of the motor vehicle, the fastening device comprising a fastening element in the form of an extruded part, and a cover which receives the fastening element at least in regions, wherein the fastening element rests against the cover on its side facing away from the gallery bar, wherein the cover comprises a fastening element receptacle in which the fastening element is arranged and which supports the fastening element with respect to the roof of the motor vehicle, wherein the fastening element comprises a first fastening recess and a second fastening recess, the first fastening recess being provided and designed for receiving a first screw connector serving to fasten the fastening element to the gallery bar and the second fastening recess being provided and designed for receiving a second screw connector serving to fasten the fastening element to the roof, wherein the fastening element further comprises a base element, which rests against the cover, and on the one hand the gallery bar connecting element extending from the base element, wherein the gallery bar connecting element projects in the direction of the gallery bar beyond the base element and receives the first fastening recess, and on the other hand a roof connecting element extending from the base element, and wherein the roof connecting element is offset in the direction facing away from the gallery bar and receives the second fastening recess, wherein the roof connecting element at least partially engages through a pass-through opening of the cover in the direction facing away from the gallery bar.

2. The roof rail according to claim 1, wherein the fastening element further comprises a support extension, which rests on the cover and which, on the side facing away from the base element, extends from the roof connecting element, is offset with respect to the roof connecting element in the direction facing the base element, as seen in longitudinal section, and the fastening element rests against the cover in a supporting manner.

3. The roof rail according to claim 2, wherein the roof connecting element is U-shaped as seen in longitudinal section so that it forms a screw connector base receptacle for receiving of a screw connector base of the second screw connector in a form-fitting manner.

4. The roof rail according to claim 1, wherein the gallery bar connecting element forms, on a side facing away from the gallery bar, a counter holder for a bottom wall of the gallery bar, and the bottom wall is held in a form-fitting manner between the counter holder and a screw connector head of the first screw connector.

5. The roof rail according to claim 1, wherein the cover has a further pass-through opening into which the first fastening recess opens and/or into which the gallery bar connecting element engages, so that the first screw connector is arranged at least in regions in the further pass-through opening.

6. The motor vehicle with a roof and a roof rail according to claim 1 fastened to the roof, wherein the cover is held in a clamping manner between the fastening element and the roof.

7. A method for mounting a roof rail according to claim 1 on a roof of a motor vehicle, wherein the cover is held in a clamping manner between the fastening element and the roof.

\* \* \* \* \*